July 16, 1935.  G. W. CLARVOE  2,008,655
VIBRATION DAMPING STRUCTURE AND METHOD OF MAKING
Filed Feb. 11, 1933
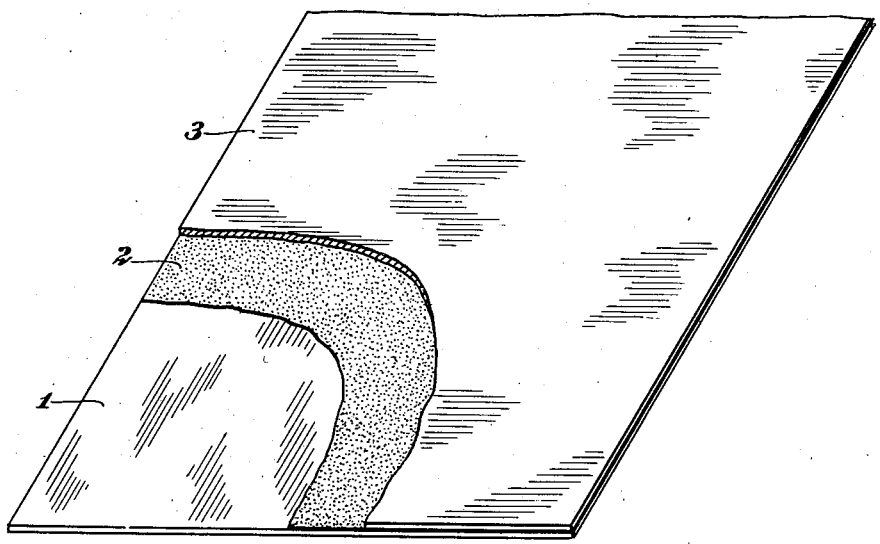
INVENTOR
George W. Clarvoe.
BY
ATTORNEY Patented July 16, 1935

2,008,655

UNITED STATES PATENT OFFICE 2,008,655

VIBRATION DAMPING STRUCTURE AND METHOD OF MAKING

George W. Clarvoe, Somerville, N. J., assignor to Johns-Manville Corporation, New York, N. Y., a corporation of New York Application February 11, 1933, Serial No. 656,242

7 Claims. (Cl. 154—28)

This invention relates to a vibration-damping structure and a method of making the same, and particularly to vibration-damping material, in the form of a sheet provided with a substantially non-tacky cementing layer applied to a face of the sheet, exposed on one face, and adapted to be softened for application to a vibratile object.

In damping vibrations of the frequency of sound in a vibratile object, such as sheet metal in an automobile body, there are now being used sheets of felt adhered, by means of a cementing material, to the vibratile object. In such use, the cementing material is applied, in the form of a solution in a volatile solvent or of an emulsion, to the face of the felt. The exposed face of the layer of cementing material, either after partial drying by the evaporation of volatile material therefrom or immediately, is then pressed against the object the vibrations of which are to be damped. The manufacture of automobile bodies will be used to illustrate the invention. In this industry, sheet metal, with vibration-damping felt adhered thereto, may be subjected to an elevated temperature at one stage of the finishing of the body. On the other hand, the finished body may be subjected to very low temperatures during use of the automobile in cold weather. It is imperative that the adhesion of the felt to the sheet metal should not be affected seriously by either the highest temperature or the lowest temperature to which the assembly is subjected.

It is an object of the present invention to provide a vibration-damping material and structure and a method of forming the structure that are convenient and time-saving in the automobile body factory, and to provide a vibration-damping structure in which the cementing layer does not extend deeply into the sheet of vibration-damping material. Other objects and advantages will appear as the detailed description of the invention progresses.

Briefly stated, the invention comprises one or more of the following features. A structure, suitable for use in damping vibrations of vibratile sheet metal or the like, comprising a formed article of vibration-damping material and, adhered to a face thereof, a layer of substantially non-tacky cementing composition provided with an exposed face adapted to be softened and then adhered to the vibratile object; a method of forming a vibration-damped structure which comprises softening the surface of the exposed face of the cementing layer described above and applying the softened surface to a vibratile object; a cementing composition, suitable for use as the preapplied layer, having the properties of relatively low fluidity at 250° F. and relatively little brittleness at winter temperatures and including, advantageously, a mixture of asphalt, a filler, and a resin; and, also, the vibration-damped assembly, including a vibratile object, vibration-damping material, and a layer of cementing composition, of type described, of minimized thickness of layer.

The embodiment of the invention that is preferred at this time is illustrated in the drawing in which:

Fig. 1 shows a cross sectional view of a sheet of vibration-damping material provided with a preapplied layer of non-tacky cementing composition; and Fig. 2 shows a perspective view, partly broken away for clearness of illustration, of a vibration-damped structure made in accordance with the invention.

The drawing shows a sheet 1 of vibration-damping material, a layer 2 of cementing composition, and a vibratile object 3 which, in this case, may be a sheet of metal or other elastic vibratile material.

The vibration-damping material comprises suitably a felted, fibrous sheet including soft fibers, say approximately 80 parts by weight of fibers and 20 parts of cellulosic fibers, such as rag fibers and 20 parts of cellulosic fibers, such as newsprint pulp. Such a sheet is formed in conventional manner and then is impregnated with a fluid protective mass-adding medium, such as asphalt or the bituminous residue from petroleum distillation. The proportion of impregnating material used is suitably substantially less than the proportion to give saturation, by which is meant a proportion substantially less than that employed in the manufacture of so-called saturated felt roofing paper. For example, there is used, satisfactorily, 90 to 140 parts by weight, say 100 to 120 parts, of the impregnating material for each 100 parts of unimpregnated, felted, fibrous sheets. A product so made and impregnated has residual porosity and is relatively resistant to the bleeding therefrom of impregnating material when subjected to elevated temperatures such as prevail in forced drying of lacquered automobile bodies, say at 250° F.

To the sheet of felted, fibrous material of type described, there is preapplied a layer of cementing composition 2. The cementing layer is applied to the sheet material preferably at the place of manufacture of the former and before shipment to the maker of the automobile body, for example. A special type of cementing composition is used. The composition should have the properties of being fluid or flowable when being applied, hardenable as by cooling or by evaporation of diluting solvent, and, when hardened preferably relatively insusceptible to change in consistency with temperature. Furthermore, the cementing composition should be one that can be readily softened, say, by the application of a solvent thereto, immediately before application to the automobile body. Also, the cementing composition, subsequent to its application to the sheet of vibration-damping material and prior to its softening, before application to the vibratile object, should be substantially non-tacky, that is, of such consistency of surface that sheets of material provided with preapplied layers of the cementing composition may be stacked, one upon another, in storage or in shipment, without adherence of the sheets to each other, or to separators to such an extent that subsequent stripping of the sheets from each other or from the separators is difficult.

Such a cement has been made of a composition comprising a viscous, water-insoluble, solvent-softenable plastic material, such as asphalt or the bituminous residue from petroleum distillation, and a filler. Preferably, the composition comprises also a resinous material.

The purpose of the filler in part is to decrease the susceptibility of the composition, whereby its fluidity is minimized at elevated temperatures and its brittleness is minimized at low temperatures. The functions of the resinous material include increasing the tackiness or stickiness of the surface of the cementing composition when moistened with a solvent and increasing also the adherence to the surface of an object that is initially oily or greasy.

The filler used should be finely divided and yet not an impalpable powder. Pulverized slate dust may be used. However, particularly satisfactory results have been obtained when the filler used was ground amphibole asbestos or "Asbestine".

The resinous material used is suitably rosin, ester gum (the substantially neutral reaction product of glycerine and rosin), or other resin that is soluble, in the presence of the other ingredients of the cement, in the solvent selected for softening of the cementing composition, as will appear later.

The proportion of ingredients in a typical cementing composition that has been used satisfactorily is the following:

*Cementing composition*

Parts by weight
Asphalt of the type used in expansion joints
 (melting point approximately 250° F.) ____ 40
Ground amphibole asbestos "Asbestine" _____ 55
Rosin _____ 5

The rosin is an asphalt-soluble resin.

The method of making a vibration-damped structure in accordance with the present invention comprises providing, first, a formed article or sheet adapted to damp vibrations, applying to a face thereof a layer of flowable but hardenable cementing composition, allowing the applied cementing composition to harden, then softening the exposed face of the cementing composition, as by the application thereto of a solvent, and then applying the softened face to the vibratile object.

The cementing composition is made by mixing the selected ingredients in warm condition, is applied warm, say at 425° F., to the sheet of vibration-damping material, suitably by means of rollers and a doctor blade, and is allowed to cool, to cause the cement to harden and become substantially non-tacky. An article so made is in condition for storage or for shipment to the user.

During the application of the cementing composition at an elevated temperature, as described, there is a concentration of the heat-softenable asphalt binder on the exposed face of the layer of said composition. This adapts the face to be softened readily in subsequent operations, whereas the body of the layer of cementing composition, containing the filler dispersed in asphalt, is of minimized susceptibility to change in consistency with temperature, as described.

At the place of use, the exposed face of the cementing layer is softened, as by the application thereto of a solvent for a major ingredient in the cementing layer. Thus, gasoline or carbon tetrachloride may be brushed on the face of the cementing layer and, shortly thereafter, the thus softened face, in slightly tacky condition, placed against the vibratile object and firmly pressed thereupon, say, by rollers. If desired, the brushing on of the solvent may be substituted by spraying or vaporizing with the solvent. The cement is softened on the surface that is to be applied to the vibratile object.

With materials of the type described, the asphalt and/or resin in the cementing layer and the protective mass-adding medium in the sheet of felted fibers may be mutually soluble (miscible) in each other. The protective medium may be identical with a major ingredient of the cement. This provides that the cementing layer is integrally united to the protective medium, which, in turn, extends throughout the sheet of felted fibers. On the other hand, the method of application of the cementing composition, with a minimum proportion of solvent, minimizes the extent to which the cementing composition penetrates the fibrous material and makes possible the preservation therein of the optimum degree of porosity and compressibility initially established in the felted fibrous material, by the degree of saturation thereof with asphalt or the like.

Furthermore, the careful control possible under the present invention permits the use of a layer of cement of minimum thickness, with uniformly good results. The layer of cementing material need be only slightly thicker than the depth of irregularities of surface that are normally present on the surface of the sheet of fibrous material. A suitable average thickness of cementing layer is 0.005 to 0.010 inch. Such a thin cement layer minimizes the tendency to slippage, particularly lateral movement at an elevated temperature.

The invention has been illustrated as applied to a sheet of felted, fibrous material comprising a fluid non-resilient protective medium, such as asphalt, impregnated thereinto. The protective medium serves to increase the durability of the felt, including its resistance to moisture and to mildew, and also adds mass, whereby there is increased the effectiveness of the sheet in damping vibrations adapted to generate sound. If the functions of the protective mass-adding medium are not desired, then such material may be omitted and the cementing composition applied directly to unimpregnated, felted fibrous material. Likewise, an ingredient of the cement or a step in the process of manufacture of the precemented sheet material may be omitted if the function of the said ingredient or step is not desired.

The details that have been given are for the purpose of illustration and not restriction, and many variations therefrom within the scope of the appended claims may be made without departing from the spirit and scope of the present invention.

What I claim is:

1. An article of manufacture, adapted for use in damping vibration of a vibratile object, comprising a vibration-damping sheet of felted, fibrous material and a bituminous, mass-adding material impregnated thereinto, in proportion to give incomplete saturation of the sheet and a product resistant to bleeding at elevated temperatures, and a preapplied substantially non-tacky cementing layer adhered at the back of the layer to the said sheet, exposed on the face, and adapted to be softened on the face and then adhered to the vibratile object, the cementing layer including an ingredient miscible with the said mass-adding material.

2. An article of manufacture, adapted for use in damping vibration of a vibratile object, comprising a sheet of fibrous material, a protective mass-adding medium impregnated thereinto, and a preapplied substantially non-tacky layer of cementing composition adhered at the back of the layer to the said sheet and exposed on its face, the cementing layer including an ingredient that is soluble in the protective medium, integrally united thereto, and adapted to be softened by the application of solvent to the exposed face and then adhered to the vibratile object.

3. An article of manufacture, adapted for use in damping vibration, comprising a fibrous sheet provided with irregularities of surface, a protective mass-adding medium impregnated thereinto, a preapplied substantially non-tacky layer of cementing composition, of thickness exceeding the depth of the said irregularities, adhered at the back of the layer to the said sheet and exposed on the face, the cementing layer including an ingredient that is soluble in the protective medium, integrally united thereto, and adapted to be softened by the application of solvent to the exposed face of the layer.

4. In making vibration-damping material adapted to be adhered to a vibratile object, the method which comprises forming a vibration-damping porous sheet, impregnating thereinto substantially uniformly a protective and non-resilient mass-adding medium, applying to a face of the impregnated sheet a layer of hardenable and then softenable cementing composition containing an ingredient miscible with the protective mass-adding medium, and causing the cementing composition to harden, whereby the cementing composition is made integral with the said medium and is adapted to be softened on the exposed face, for application to the vibratile object.

5. In making vibration-damping material adapted to be adhered to a vibratile object, the method which comprises forming a vibration-damping porous sheet, impregnating thereinto substantially uniformly a protective and non-resilient mass-adding medium in amount substantially less than the quantity required to saturate the said sheet, with preservation of the porosity of the sheet, applying to a face of the impregnated sheet a layer of hardenable and then softenable cementing composition containing an ingredient miscible with the protective mass-adding medium, and causing the cementing composition to harden, the cementing composition being thus made integral with the said medium and adapted to be softened on the exposed face, for application to the vibratile object.

6. In making a vibration-damping material adapted for application to a vibratile object, the method which comprises forming a vibration-damping sheet, applying to a face thereof a layer of hardenable composition including a heat-softenable non-resilient binder and solid filler dispersed therethroughout, subjecting the said composition to an elevated temperature, to cause concentration of binder on the exposed face of the said layer, and then allowing the composition to harden.

7. An article of manufacture, adapted for use in damping vibration, comprising a vibration-damping sheet, a mass-adding ingredient impregnated thereinto in proportion to give incomplete saturation of the sheet, and a preapplied substantially non-tacky cementing composition of bituminous and finely divided filler material combining relatively low fluidity at 250° F. with relatively low brittleness at atmospheric temperatures, the said composition forming a layer adhered at its back to the said sheet, exposed on its face, and adapted to be softened by the application of a solvent to the face and then adhered to a vibratile object, and the said composition including an ingredient miscible with the said mass-adding ingredient.

GEORGE W. CLARVOE.